P. MORREN.
SPRING SUSPENSION FOR VEHICLES.
APPLICATION FILED JAN. 4, 1910.
977,392.
Patented Nov. 29, 1910.
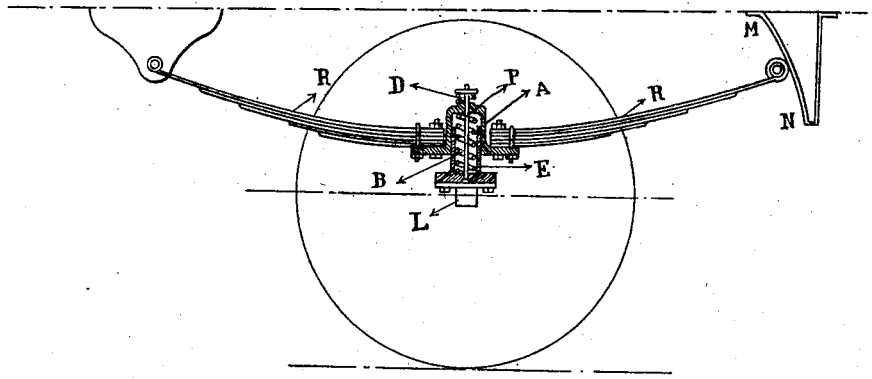
WITNESSES
INVENTOR
PROSPER MORREN
by Howson and Howson
his Attorneys

UNITED STATES PATENT OFFICE.

PROSPER MORREN, OF BRUSSELS, BELGIUM.

SPRING SUSPENSION FOR VEHICLES.

977,392.  Specification of Letters Patent.  Patented Nov. 29, 1910.

Application filed January 4, 1910. Serial No. 536,396.

*To all whom it may concern:*

Be it known that I, PROSPER MORREN, a subject of the King of Belgium, residing at Brussels, Belgium, have invented certain new and useful Improvements in Spring Suspension for Vehicles, of which the following is a specification.

The object of my invention is to prevent or avoid not only the sudden shocks which may be caused to a vehicle by rough places on a bad road, such as hollows, and hillocks, etc., but also all vibrations produced by inequalities of the road, bad paving, etc. For this purpose, the chassis or frame of the vehicle is mounted upon springs of the kind shown in the annexed drawing, which is a view in side elevation, partly in section.

The spring is formed of two half springs R, R, adapted to a cylindrical box A. One of the half springs is fixed at its end to the chassis of the vehicle in the ordinary manner. The free end of the other half spring carries a roller which rolls on a concave surface M N also fixed to a chassis or frame. The rolling surface may be adapted to the end of the half spring and the roller to the chassis or frame of the vehicle.

The cylinder box A contains a spiral spring B which presses upon a piston E connected to the axle L of the wheel. This spring is held in the hollow piston in the center of which is passed a rigid rod P guiding the movements of the cylindrical box. This rod is provided with an exterior spiral spring D pressing upon the box A and is for preventing the piston E from completely leaving the box.

The action of the apparatus thus arranged will be readily understood; the inequalities or unevenness of the ground, rough paving, etc., act on the spring B through the piston E which suppresses the vibrations, or rather prevents them from being transmitted to the frame or chassis of the vehicle.

Should the wheel encounter an extra bad piece of ground, a deep rut, hillock, obstacle or the like, at the same time as the piston E plunges into the box A, compressing the spring B and thus partly destroying the effect of the obstacle on the vehicle, but also the free end of the spring R slides over the concave surface M N and allowing the spring R to flatten and to yield completely to the unevenness of the ground without subjecting the vehicle to any shock.

What I do claim as my invention, and desire to secure by Letters Patent is:—

1. In a suspension device for vehicles and the like, a supporting spring means fastened at one end to the vehicle frame and free at the other end, together with an inclined bearing surface rigid with the vehicle body over which said free end travels when the spring is subjected to stress, substantially as described.

2. In a suspension device for vehicles and the like, a supporting spring means fastened at one end to the vehicle frame and free at the other end, together with an inclined bearing surface rigid with the vehicle body over which said free end travels when the spring is subjected to stress, together with means for cushioning said spring means upon the axle of a wheel, substantially as described.

3. In a suspension device for vehicles and the like, a supporting spring means fastened at one end to the vehicle frame and free at the other end, together with a curved bearing surface rigid with the vehicle body over which said free end travels when the spring is subjected to stress, substantially as described.

4. In a suspension device for vehicles and the like, a supporting spring means fastened at one end to the vehicle frame and free at the other end, together with a bearing surface curved approximately in the arc of the spring when the latter is subjected to stress, over which bearing surface the free end of the spring may travel, substantially as described.

In testimony whereof I have hereunto set my hand in presence of two subscribing witnesses.

PROSPER MORREN.

Witnesses:
 GUSTAVE PIERRY,
 EMITE NUYTS.